US012777053B2

(12) United States Patent
Weiner et al.

(10) Patent No.: US 12,777,053 B2
(45) Date of Patent: Oct. 27, 2026

(54) METHOD FOR DETECTING A SUPPRESSION OF A SECURITY-RELATED DATA TRANSMISSION FROM A VEHICLE TO A VEHICLE-EXTERNAL SERVER, COMPUTER-READABLE MEDIUM, SYSTEM AND VEHICLE

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 152 days.

(21) Appl. No.: 18/690,994

(22) PCT Filed: Jul. 11, 2022

(86) PCT No.: PCT/EP2022/069245

§ 371 (c)(1),
(2) Date: Mar. 11, 2024

(87) PCT Pub. No.: WO2023/041221

PCT Pub. Date: Mar. 23, 2023

(65) Prior Publication Data

US 2024/0396915 A1 Nov. 28, 2024

(30) Foreign Application Priority Data

Sep. 14, 2021 (DE) ..................... 10 2021 123 785.8

(51) Int. Cl.
*B60R 16/023* (2006.01)
*B60R 25/00* (2013.01)
(Continued)

(52) U.S. Cl.
CPC ...... *H04L 63/1425* (2013.01); *H04L 63/1416* (2013.01); *H04W 4/44* (2018.02); *H04L 2463/121* (2013.01)

(58) Field of Classification Search
None
See application file for complete search history.

(56) References Cited

U.S. PATENT DOCUMENTS

| | | | | |
|---|---|---|---|---|
| 10,104,104 B1 | 10/2018 | Juels et al. | | |
| 2015/0166010 A1* | 6/2015 | Kyung | ................ | G08B 29/188 340/426.24 |

(Continued)

FOREIGN PATENT DOCUMENTS

| | | | | |
|---|---|---|---|---|
| DE | 102019117946 A1 | 1/2021 | | |
| EP | 3291119 A1 | 3/2018 | | |
| KR | 20210097471 A * | 8/2021 | ........... | H04L 9/3297 |

OTHER PUBLICATIONS

International Search Report corresponding to International Patent Application No. PCT/EP2022/069245, dated Nov. 4, 2022 (5 pages).

(Continued)

*Primary Examiner* — Christopher B Robinson
(74) *Attorney, Agent, or Firm* — Maginot, Moore & Beck LLP

(57) ABSTRACT

A method for detecting a suppression of a security-related data transmission from a vehicle to a vehicle-external server includes receiving a current data transmission of the vehicle via a first function of the vehicle-external server. The method also includes determining a last, security-related data transmission of the vehicle to a security-related function of the vehicle-external server via the vehicle-external server, and checking the plausibility of the current data transmission to the first function of the vehicle-external server based at least in part on the last, security-related data transmission to the security-related function of the vehicle-
(Continued)

external server. The method further includes detecting the suppression of a current, security-related data transmission to the security-related function of the vehicle-external server via the vehicle-external server according to the plausibility check of the current data transmission.

19 Claims, 2 Drawing Sheets

(51) Int. Cl.
*H04L 9/40* (2022.01)
*H04W 4/44* (2018.01)

(56) References Cited

U.S. PATENT DOCUMENTS

| | | | | |
|---|---|---|---|---|
| 2016/0173530 | A1* | 6/2016 | Miyake | H04L 63/20 726/3 |
| 2017/0214760 | A1* | 7/2017 | Lee | H04L 67/563 |
| 2017/0259762 | A1* | 9/2017 | Zoeller | B60R 25/24 |
| 2019/0036946 | A1* | 1/2019 | Ruvio | H04W 12/10 |
| 2019/0068639 | A1 | 2/2019 | Alexander et al. | |
| 2020/0128031 | A1 | 4/2020 | Juliato et al. | |
| 2020/0389475 | A1 | 12/2020 | Maeda et al. | |
| 2022/0022032 | A1* | 1/2022 | Ernst | H04L 63/0421 |

OTHER PUBLICATIONS

Written Opinion corresponding to International Patent Application No. PCT/EP2022/069245, dated Nov. 4, 2022 (7 pages).
German Search Report corresponding to German Patent Application No. 10 2021 123 785.8, dated Jun. 3, 2022. (8 pages).
Kukkala, Vipin Kumar, Sooryaa Vignesh Thiruloga, and Sudeep Pasricha. "INDRA: Intrusion detection using recurrent autoencoders in automotive embedded systems." IEEE Transactions on Computer-Aided Design of Integrated Circuits and Systems 39.11 (2020): 3698-3710.

* cited by examiner

METHOD FOR DETECTING A SUPPRESSION OF A SECURITY-RELATED DATA TRANSMISSION FROM A VEHICLE TO A VEHICLE-EXTERNAL SERVER, COMPUTER-READABLE MEDIUM, SYSTEM AND VEHICLE

The present application is the U.S. national phase of PCT Application PCT/EP2022/069245 filed on Jul. 11, 2022, which claims priority of German patent application No. 102021123785.8 filed on Sep. 14, 2021, which is incorporated herein by reference in its entirety.

TECHNICAL FIELD

The disclosure relates to detecting a suppression of a security-related data transmission from a vehicle to a vehicle-external server.

BACKGROUND

The prior art describes vehicles that are able to transmit security-related data via a communication channel to a backend server. The security-related data can be transmitted here via a separate communication channel from the vehicle to the backend server. If an attacker performs a manipulation at the vehicle that suppresses a transmission of security-related data to the backend server, this manipulation often cannot be detected.

There is a need, therefore, to efficiently detect a suppression of a transmission of security-related data from the vehicle to a vehicle-external server. In particular, there is a need is to efficiently detect a suppression of a transmission of security-related data from the vehicle to a vehicle-external server via the vehicle-external server.

SUMMARY

The above-described needs, as well as others, are addressed by at least some advantageous embodiments and developments described herein.

A first aspect is a method for detecting a suppression of a security-related data transmission from a vehicle to a vehicle-external server via the vehicle-external server. The method can be a computer-implemented method. The vehicle can be a motor vehicle or a motorbike. The security-related data transmission can be a data transmission of an intrusion-detection system (IDS for short) of the vehicle. The security-related data transmission can comprise diagnosis data, log data and/or alarm messages from one or more control units and/or one or more bus systems of a vehicle. The vehicle-external server can be a backend server and/or a cloud server of a vehicle manufacturer and/or of a third party.

The method comprises receiving a current data transmission of the vehicle via a first function of the vehicle-external server. The current data transmission may comprise no security-related data transmission or may indeed comprise a security-related data transmission. Furthermore, the current data transmission can comprise one or more data transmissions to one or more functions and/or services of the vehicle-external server. The method determines a last, security-related data transmission of the vehicle to a security-related function of the vehicle-external server via the vehicle-external server. The method then checks the plausibility of the current data transmission to the first function of the vehicle-external server with the last, security-related data transmission to the security-related function of the vehicle-external server. Depending on the plausibility check of the current data transmission, in particular, depending on a result of the plausibility check of the current data transmission, the method detects the suppression of a current, security-related data transmission to the security-related function of the vehicle-external server via the vehicle-external server.

The method can advantageously efficiently detect a suppression of a security-related data transmission to a vehicle-external server. If a vehicle remains unconnected to the vehicle-external server temporarily, for example for a few seconds, a few minutes, or a few hours, and/or over a longer period of time, for example several days, several weeks, or several months, the vehicle-external server can detect a suppression of the security-related data transmission. Furthermore, the method can distinguish a failure of a communications link, for example due to a defect of a mobile radio module of the vehicle, from the suppression of the security-related communication and thus can detect the suppression of the security-related communication.

According to a first embodiment, the plausibility check of the current data transmission to the first function of the vehicle-external server with the last, security-related data transmission the security-related function of the vehicle-external server can comprise determining a relative, temporal dependency between the current data transmission and the last, security-related data transmission and a detection of the suppression of the current, security-related data transmission from the vehicle to the vehicle-external server via the vehicle-external server, if the relative, temporal dependency between the first data transmission and the last, security-related data transmission lies outside a specified time interval. The plausibility of the current data transmission can hereby be checked efficiently.

According to at least some embodiments, the current data transmission can comprise one or more data packets from one or more control units of the vehicle, wherein the current data transmission comprises collected data packets of all control units of the vehicle.

According to some embodiments, the method can further comprise receiving the current data transmission via a second function of the vehicle-external server, and checking the of plausibility the current data transmission to the first function and/or to the second function of the vehicle-external server with the last, security-related data transmission to the security-related function of the vehicle-external server. The plausibility of the current data transmission can hereby be checked more precisely and/or more reliably.

In some embodiments, the method can further comprise receiving the current data transmission via a security-related function of the vehicle-external server and storing the current data transmission as the last, security-related data transmission via the vehicle-external server if the current data transmission comprises one or more data packets to the security-related function of the vehicle-external server. The last, security-related data transmission can hereby be updated efficiently.

According to one or more embodiments, each data packet of the current data transmission can be a signed data packet, and the first function, the second function and/or the security-related function of the vehicle-external server can check a signature of a signed data packet of the current data transmission relevant for the respective function. If the first function, the second function and/or the security-related function determines an error when checking the signature of the signed data packet relevant for the respective function, the method can provide an alarm message to a vehicle manufacturer and/or a user of the vehicle. An integrity of the data packets of the current data transmission can hereby be checked efficiently.

According to some embodiments, the detection of the suppression of a current, security-related data transmission to the security-related function of the vehicle-external server via the vehicle-external server according to the plausibility check of the current data transmission can comprise providing an alarm message to a vehicle manufacturer and/or a user of the vehicle. The vehicle manufacturer and/or the user of the vehicle can hereby be informed of a possible manipulation of the vehicle and in particular of a suppression of the current, security-related data transmission.

A further aspect, is a non-transitory computer-readable medium for detecting a suppression of a security-related data transmission from a vehicle to a vehicle-external server via the vehicle-external server, wherein the non-transitory computer-readable medium comprises instructions that, when executed on a computer, execute the above-described method.

A further aspect is a system for detecting a suppression of a security-related data transmission from a vehicle to a vehicle-external server via the vehicle-external server, wherein the system is designed to carry out the above-described method.

A further aspect is a vehicle comprising the above-described system for detecting a suppression of a security-related data transmission from a vehicle to a vehicle-external server via the vehicle-external server.

Further features can be found in the claims, the figures and the figure description. All of the features and feature combinations stated in the description as well as the features and feature combinations described hereinafter in the figure description and/or shown alone in the figures are usable not only in the combination stated in each case, but also in other combinations or in isolation.

Hereinafter, an advantageous exemplary embodiment will be described on the basis of the appended drawings. Further details and embodiments and developments are thus provided.

DETAILED DESCRIPTION

Figure 1:
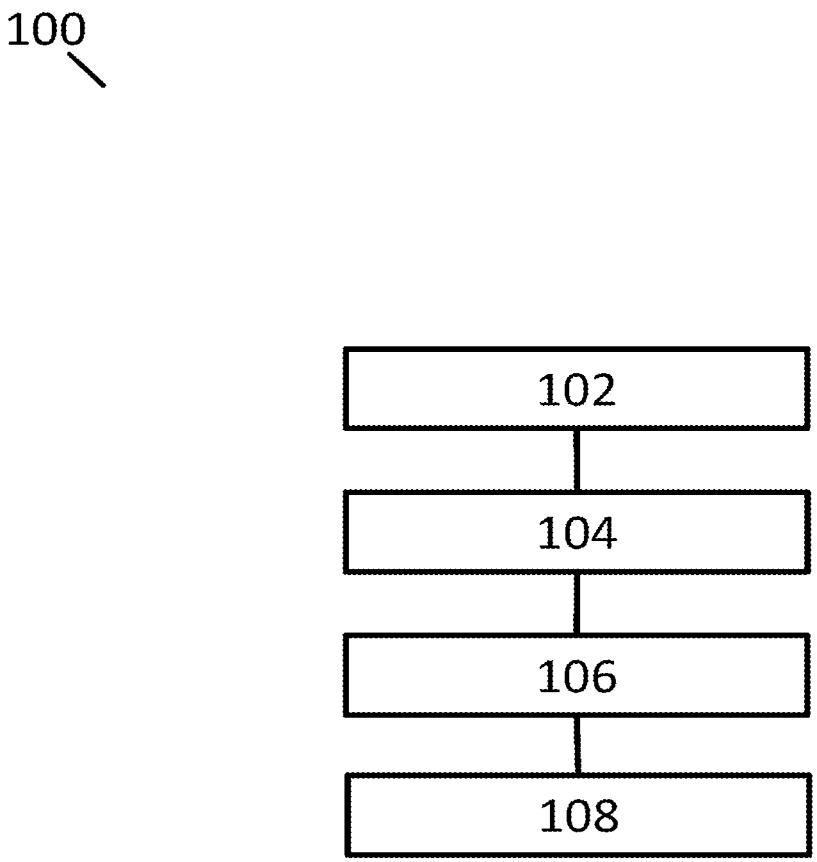
FIG. 1 shows an exemplary method for detecting a suppression of a security-related data transmission from a vehicle to a vehicle-external server.

In detail, FIG. 1 shows an exemplary method 100 for detecting a suppression of a security-related data transmission from a vehicle to a vehicle-external server. The method 100 can comprise receiving 102 a current data transmission of the vehicle via a first function of the vehicle-external server. The current data transmission can comprise one or more data packets for a client function, a service or diagnosis function, and/or a security-related function of the vehicle-external server. The current data transmission preferably comprises at least one data packet for a function of the vehicle-external server. The vehicle can have, for example, an intrusion-detection system (IDS for short). The IDS can transmit data packets, which for example comprise alarm information or alarm messages and/or log files, to the vehicle-external server in the current data transmission. The data packets of the IDS of the vehicle can be a security-related data transmission to the vehicle-external server. The security-related function of the vehicle-external server can be a server-based backend service of the IDS of the vehicle that can receive and process the security-related data transmission of the vehicle.

Furthermore, the method 100 includes determining 104 a last, security-related data transmission of the vehicle to a security-related function of the vehicle-external server via the vehicle-external server. The vehicle-external server stores the last, correctly received, security-related data transmission. In particular, the vehicle-external server stores a timestamp of the last, correctly received, security-related data transmission. By way of a querying of the last, stored security-related data transmission, the vehicle-external server can determine 104 the last, security-related data transmission.

The method 100 includes checking the plausibility 106 of the current data transmission to the first function of the vehicle-external server with the last, security-related data transmission to the security-related function of the vehicle-external server. The last, security-related data transmission can be part of the current data transmission. Alternatively, the last, security-related data transmission can be a part of a past data transmission from the vehicle to the vehicle-external server. The plausibility check can comprise a comparison of a timestamp of the current data transmission to the first function and of a timestamp of the last, security-related data transmission. For example, the vehicle-external server can use a maximum, specified time interval for the plausibility check, which defines a maximum time period between the timestamp of the current data transmission and the timestamp of the last, security-related data transmission. If the result of the plausibility check is that both timestamps, the timestamp of the current data transmission the timestamp of the last, security-related data transmission, lie within the maximum specified interval, there is no suppression of the security-related data transmission from the vehicle to the vehicle-external server. Otherwise, a suppression of the security-related data transmission from the vehicle to the security-related server is present. Additionally or alternatively, the vehicle-external server, during the plausibility check, can check a frequency of security-related data transmissions within a specified time interval. The frequency of security-related data transmissions is preferably checked only if, in the specified time intervals, current data transmissions via the vehicle-external server are received from the vehicle. If a specified minimal frequency of safety-relevant data transmissions is exceeded there is no suppression of the security-related data transmission from the vehicle to the vehicle-external server. If the specified, minimal frequency of security-related data transmissions is not exceeded, there is a suppression of the security-related data transmission from the vehicle to the vehicle-external server.

Furthermore, the vehicle-external server can determine a frequency of security-related data transmissions in relation to a frequency of current data transmissions. If the frequency of security-related data transmissions in relation to the frequency of current data transmissions drops below a specified threshold value, the vehicle-external server can assert a suppression of the security-related data transmission.

The above-mentioned possibilities for checking the plausibility of the current data transmission can be determined in relation to an individual control unit of the vehicle, a subset of control units of the vehicle and/or all control units of the vehicle. The vehicle-external server can thus determine a suppression of a security-related data transmission flexibly for control units of the vehicle and can identify one or more control units more precisely, the security-related data transmission of which is suppressed.

Furthermore, the method 100 includes detecting 108 the suppression of a current, security-related data transmission the security-related function of the vehicle-external server via the vehicle-external server according to the plausibility check of the current data transmission. As described above, the method 100 includes, in the event that various parameters are exceeded or undershot during the plausibility check of the current data transmission, detecting a suppression of the current, security-related data transmission. If the result of the plausibility check is that the current data transmission is plausible in relation to the last, security-related data transmission, there is no suppression of the current, security-related data transmission. If the result of the plausibility check is that the current data transmission is not plausible in relation to the last, security-related data transmission, the method 100 can detect that the current, security-related data transmission is suppressed.

Figure 2:
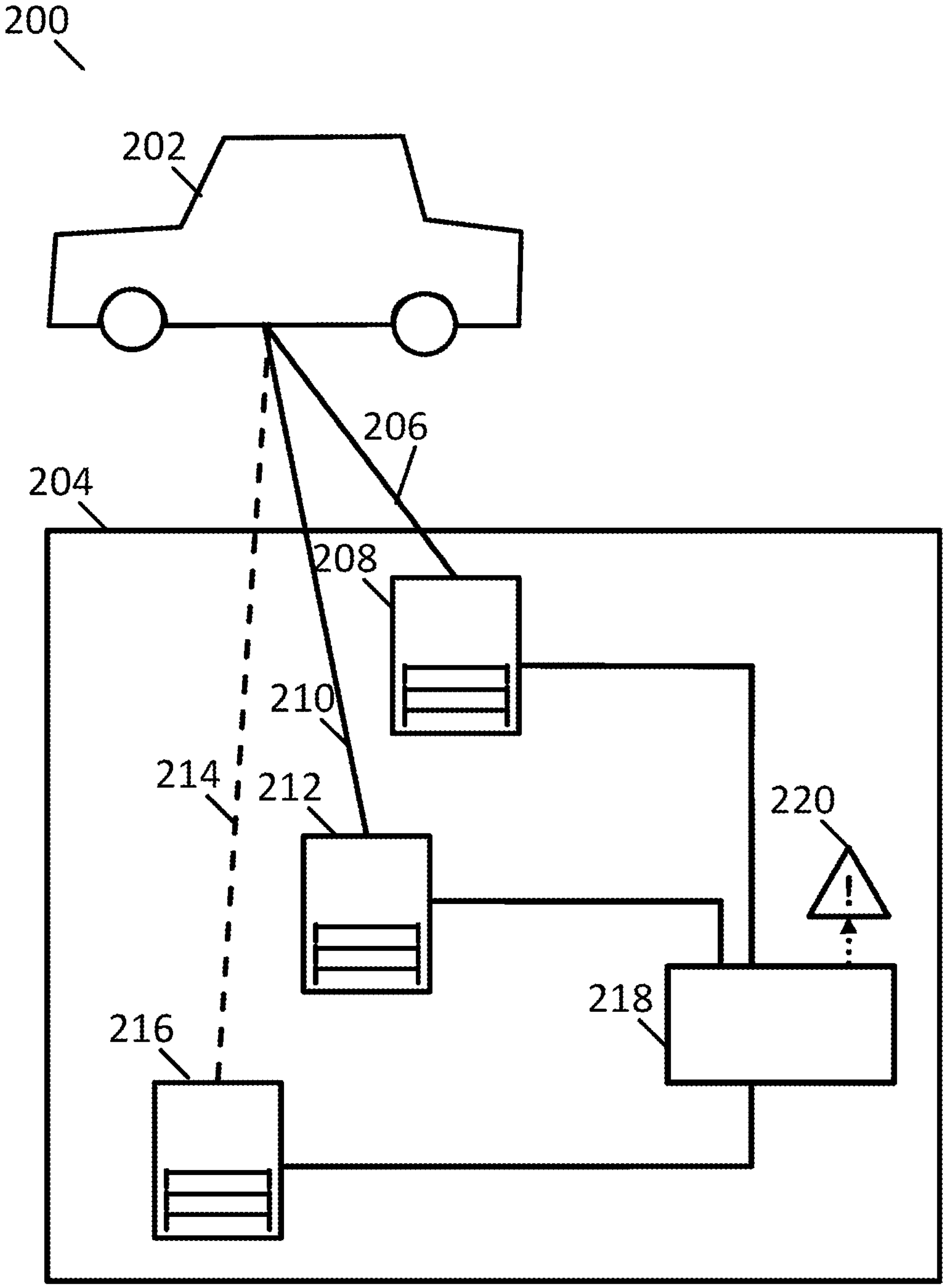
FIG. 2 shows an exemplary system for detecting a suppression of a security-related data transmission from a vehicle to a vehicle-external server.

In detail, FIG. 2 shows an exemplary system 200 for detecting a suppression of a security-related data transmission from a vehicle 202 to a vehicle-external server 204. The vehicle 202 can transmit a current data transmission to the vehicle-external server. The current data transmission can comprise a first data transmission 206 to a first service 208 of the vehicle-external server 204 and a second data transmission 210 to a second service 212 of the vehicle-external server. A security-related data transmission 214 to a security-related service 216 of the vehicle-external server 204 is not contained in the current data transmission, since the security-related data transmission 214 has been manipulated by an attacker. A plausibility-checking module 218 of the vehicle-external server 204 can check the plausibility of the first data transmission 206 and the second data transmission 210, as described above in conjunction with FIG. 1, and can detect a suppression of the security-related data transmission. The plausibility-checking module 218 of the vehicle-external server 204 can transmit an alarm message 220 to a vehicle manufacturer and/or to a vehicle user.

The method 100 and/or the system 200 can advantageously efficiently detect a manipulation in a vehicle that leads to a suppression of a security-related data transmission to a vehicle-external server. The security-related data transmission can be, for example, a data transmission of an IDS of the vehicle to a backend server. In particular, the vehicle-external server can efficiently detect a suppression of the security-related data transmission in the event of a functioning data transmission from the vehicle to the vehicle-external server. Erroneous alarms by the vehicle-external server, for example in the event of a failure of the communication module, can hereby be avoided.

LIST OF REFERENCE SIGNS

100 method
102 receiving a current data transmission of the vehicle
104 determining a last, security-related data transmission of the vehicle
106 checking the plausibility of the current data transmission
108 detecting a suppression of a current, security-related data transmission
200 system
202 vehicle
204 vehicle-external server
206 first data transmission
208 first service
210 second data transmission
212 second service
214 security-related data transmission
216 security-related service
218 plausibility-checking module
220 alarm message

The invention claimed is:

1. A method for detecting a suppression of a security-related data transmission from a vehicle to a vehicle-external server via the vehicle-external server, the method comprising:

receiving a current data transmission of the vehicle via a first function of the vehicle-external server;

determining a last, security-related data transmission of the vehicle to a security-related function of the vehicle-external server via the vehicle-external server;

checking the plausibility of the current data transmission to the first function of the vehicle-external server based at least in part on the last, security-related data transmission to the security-related function of the vehicle-external server; and detecting the suppression of a current, security-related data transmission to the security-related function of the vehicle-external server via the vehicle-external server according to the plausibility check of the current data transmission.

2. The method as claimed in claim 1, wherein checking the plausibility of the current data transmission to the first function of the vehicle-external server based at least in part on the last, security-related data transmission to the security-related function of the vehicle-external server comprises:

determining a relative, temporal dependency between the current data transmission and the last, security-related data transmission; and if the relative, temporal dependency between the first data transmission and the last, security-related data transmission lies outside a specified time interval, then detecting the suppression of the current, security-related data transmission from the vehicle to the vehicle-external server via the vehicle-external server.

3. The method as claimed in claim 1, wherein the current data transmission comprises one or more data packets from one or more control units of the vehicle.

4. The method as claimed in claim 3, wherein each data packet of the current data transmission is a signed data packet; and wherein at least one function of the vehicle-external server checks a signature of a signed data packet of the current data transmission relevant to the at least one function, wherein the at least one function comprises one or more of the group consisting of the first function, the second function and the security-related function of the vehicle-external server; and if the at least one function determines an error when checking the signature of the signed data packet relevant to the at least one function:

providing an alarm message to a vehicle manufacturer and/or a user of the vehicle.

5. The method as claimed in claim 3, wherein the current data transmission comprises collected data packets of all control units of the vehicle.

6. The method as claimed in claim 5, wherein detecting the suppression of the current, security-related data transmission from the vehicle to the vehicle-external server via the vehicle-external server comprises providing an alarm message to at least one of the group consisting of a vehicle manufacturer and a user of the vehicle.

7. The method as claimed in claim 6, wherein checking the plausibility of the current data transmission to the first function of the vehicle-external server based at least in part on the last, security-related data transmission to the security-related function of the vehicle-external server comprises:

determining a relative, temporal dependency between the current data transmission and the last, security-related data transmission; and if the relative, temporal dependency between the first data transmission and the last, security-related data transmission lies outside a specified time interval, then detecting the suppression of the current, security-related data transmission from the vehicle to the vehicle-external server via the vehicle-external server.

8. The method as claimed in claim 7, wherein at least one control unit includes an intrusion detection system.

9. The method as claimed in claim 6, wherein checking the plausibility of the current data transmission to the first function of the vehicle-external server comprises a comparison of a timestamp of the current data transmission to the first function to a timestamp of the last, security-related data transmission.

10. The method as claimed in claim 1, wherein at least one control unit includes an intrusion detection system.

11. The method as claimed in claim 1, the method further comprising:

receiving the current data transmission via a second function of the vehicle-external server; and checking the plausibility of the current data transmission to at least one of the first function or the second function of the vehicle-external server with the last, security-related data transmission to the security-related function of the vehicle-external server.

12. The method as claimed in claim 1, the method further comprising:

receiving the current data transmission via a security-related function of the vehicle-external server; and storing the current data transmission as the last, security-related data transmission by the vehicle-external server, if the current data transmission comprises one or more data packets for the security-related function of the vehicle-external server.

13. A method for detecting a suppression of a security-related data transmission from a vehicle to a vehicle-external server via the vehicle-external server, the method comprising:

receiving a current data transmission of the vehicle via a first function of the vehicle-external server;

determining a last, security-related data transmission of the vehicle to a security-related function of the vehicle-external server via the vehicle-external server;

checking the plausibility of the current data transmission to the first function of the vehicle-external server based at least in part on the last, security-related data transmission to the security-related function of the vehicle-external server; and detecting the suppression of a current, security-related data transmission to the security-related function of the vehicle-external server via the vehicle-external server according to the plausibility check of the current data transmission;

wherein each data packet of the current data transmission is a signed data packet; and wherein at least one function of the vehicle-external server checks a signature of a signed data packet of the current data transmission relevant to the at least one function, wherein the at least one function comprises one or more of the group consisting of the first function, the second function and the security-related function of the vehicle-external server; and if the at least one function determines an error when checking the signature of the signed data packet relevant to the at least one function:

providing an alarm message to at least one of the group consisting of a vehicle manufacturer and a user of the vehicle.

14. The method as claimed in claim 1, wherein detecting the suppression of the current, security-related data transmission from the vehicle to the vehicle-external server via the vehicle-external server comprises providing an alarm message to at least one of the group consisting of a vehicle manufacturer and a user of the vehicle.

15. The method as claimed in claim 1, wherein checking the plausibility of the current data transmission to the first function of the vehicle-external server comprises a comparison of a timestamp of the current data transmission to the first function to a timestamp of the last, security-related data transmission.

16. A non-transitory computer-readable medium for detecting a suppression of a security-related data transmission from a vehicle to a vehicle-external server via the vehicle-external server, wherein the non-transitory computer-readable medium comprises instructions that, when executed on a computer, execute the method as claimed in claim 11.

17. A system for detecting a suppression of a security-related data transmission from a vehicle to a vehicle-external server via the vehicle-external server, wherein the system is designed to carry out the method as claimed in claim 1.

18. A first vehicle comprising the system for detecting a suppression of a security-related data transmission from a vehicle to a vehicle-external server via the vehicle-external server as claimed in claim 17.

19. The method as claimed in claim 3, wherein each data packet of the current data transmission is a signed data packet; and wherein at least one function of the vehicle-external server checks a signature of a signed data packet of the current data transmission relevant to the at least one function, wherein the at least one function comprises one or more of the group consisting of the first function, the second function and the security-related function of the vehicle-external server; and if the at least one function determines an error when checking the signature of the signed data packet relevant to the at least one function:

providing an alarm message to a vehicle manufacturer and a user of the vehicle.

* * * * *